May 31, 1932.  C. B. DART  1,860,660
DOVETAILING ATTACHMENT
Filed Sept. 29, 1930  5 Sheets-Sheet 3
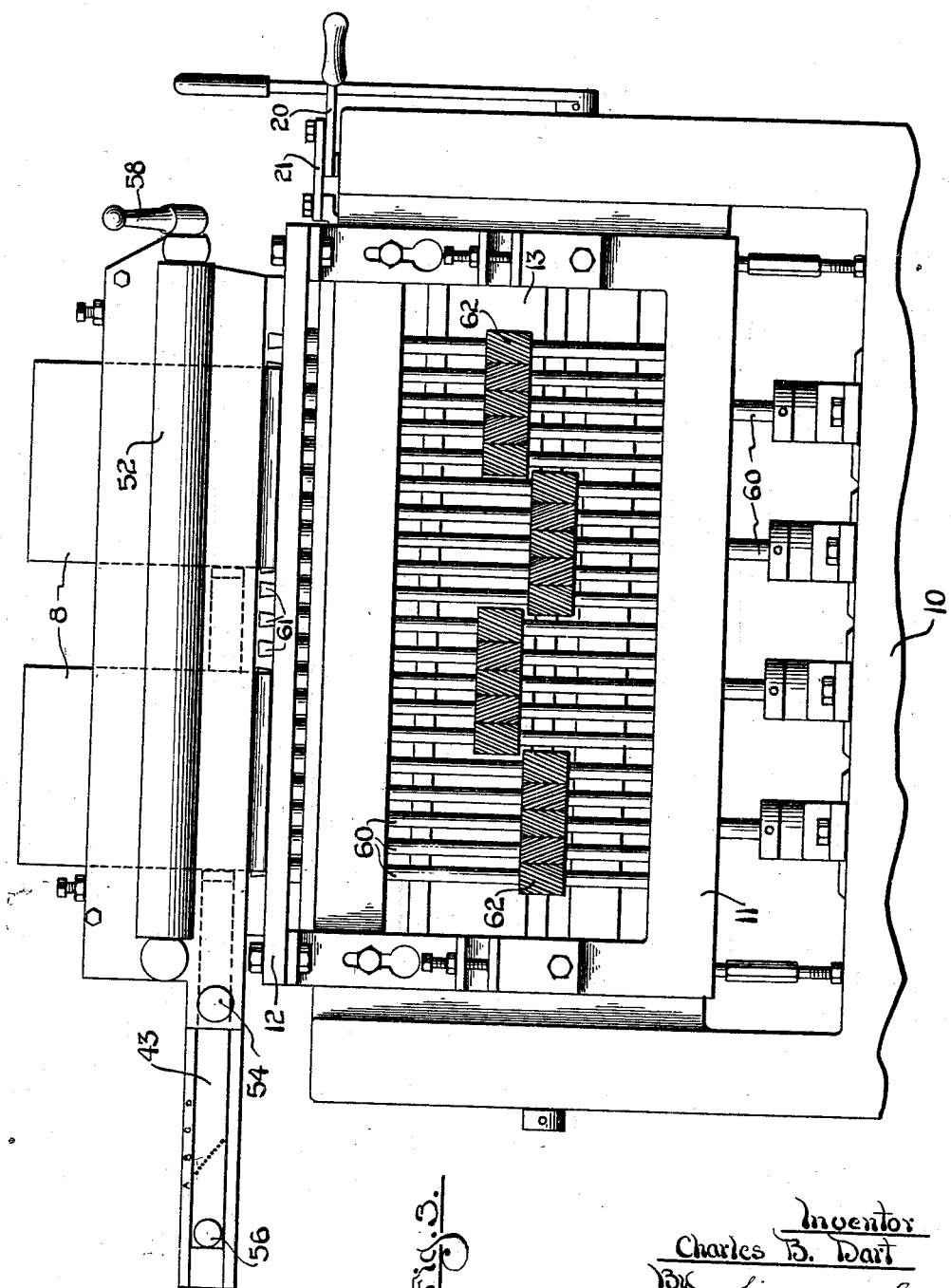

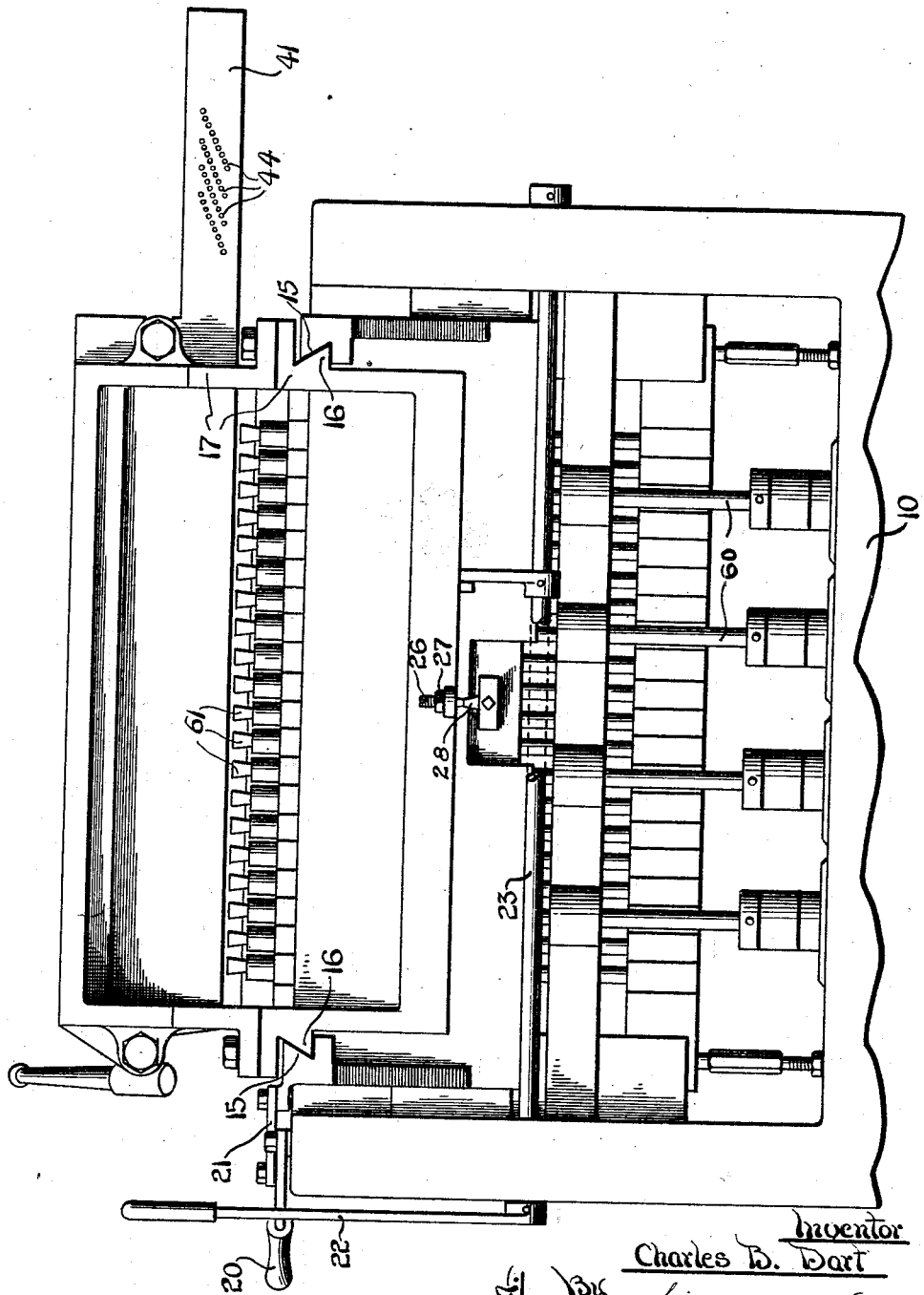

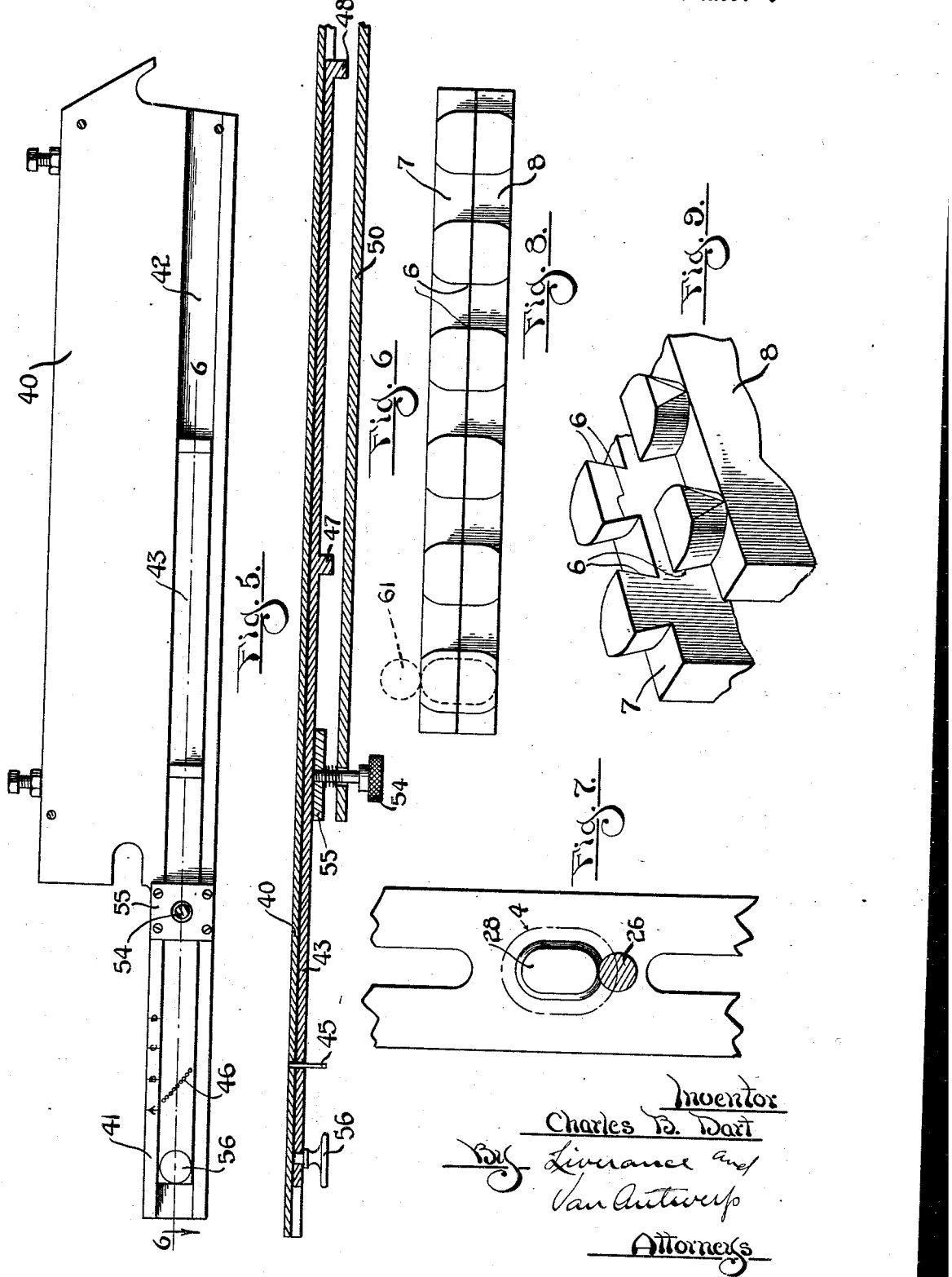

Patented May 31, 1932

1,860,660

UNITED STATES PATENT OFFICE

CHARLES B. DART, OF GRAND RAPIDS, MICHIGAN

DOVETAILING ATTACHMENT

Application filed September 29, 1930. Serial No. 484,986.

This invention relates to the art of woodworking machinery and is more particularly adapted to form the ends or edges of material whereby connections may be made therebetween.

Present day machines are capable of acting upon the end or edge of a single board to thereby cut tenons, with mortises therebetween, but such an operation is more or less unsatisfactory for two reasons. In the first place, the cross section of the tenon which is cut is not regular in form, being curved at one edge and having rather abrupt corners at its rear edge. This irregular or unsymmetrical cross section causes the cutting cones or knives to tear the wood or the like when the same leave the material. In the second place, the cutting of a single row of tenons is a slow process as each board must be operated upon singly.

In my machine I aim to overcome both of the above mentioned difficulties by so constructing my machine as to make it possible to place two boards or blanks in the cutting machine at the same time, these boards being back to back and in an aligned position with each other. By such positioning I obtain two completely finished units when the cutting manipulation is finished but what is of much greater importance, is the fact that by placing these boards in such reinforcing relationship I prevent the fraying and tearing of the wood adjacent the abrupt corners of each of the tenons as the boards have such abrupt corners positioned adjacent each other whereby they support one another. In other words, the boards travel entirely around the cutters which cut the tenons thereon and hence there is neither an abrupt departure nor abrupt entry of the cutters relative to the boards and consequently a much smoother tenon is formed which, obviously, is advantageous as it makes for a better finished joint between the several units.

As a matter of fact, there are machines on the market today in common usage which are adapted to receive two blanks or boards but these boards are adapted to be placed in linear relationship to each other and above a series of cutters and one board is adapted to receive a left hand cut tenon while the other board receives a right hand cut tenon. That is, the machine would receive two boards, such as the opposite side boards of a drawer and by clamping these boards side by side in the machine and proper operation upon first one end and then the other end of these boards proper tongues or tenons would be formed thereon at both ends. Now, in my improved device, it is possible to take four of these boards, placing them in two sets and by exactly the same manipulations as just set forth, obtain two sets of sides for similar drawers or the like. And furthermore, the tenons will be of better shape and have smoother edges due to the fact that the tenons are cut in pairs and one tenon will support the other.

At this point it is desired to explain that my machine is adapted to cut only the male tenons and simultaneously the mortise therebetween and the mating edge or the end pieces of the drawer or the like may be cut in the usual manner.

Previous to my invention it has not been possible to form two tenons at once as it has always been considered necessary to support the board which is being worked upon at its lower end and by so doing the cutter is not free to travel in a closed circular path but could only travel partly through such a path and then had to be retracted to its starting point, thus working only during half of its travel with consequent inefficiency. Moreover, as explained before, such a path of travel of the revolving cutter caused the cutter to leave the wood at an abrupt angle with the result that the edge of the tenon was more or less ragged.

I have found that it is unnecessary to support the boards which are being worked upon at their lower ends and I have invented a machine which supports the boards just above the tops of the row or cutters and moreover supports a double set of boards whereby at each manipulation of the series of cutters in their chosen closed curved paths each cutter acts upon both of the boards and cuts the required tenons thereon.

The several sets of boards are clamped in a set of jaws which are mounted upon a frame, this frame being adapted to be manually operated in the chosen curved path, being guided in such a path by my novel pin and cam arrangement. As will be set forth later in the specification, both the pin and its cam are tapered whereby vertical movement therebetween causes the path traversed by the pin to become either larger or smaller, and hence the cross sectional size of the tenons may be adjusted.

Another feature of my invention is the adjustable rest or plate located immediately in front of the cutters, such a plate serving to adjust the bottoms of the blanks to their proper height, whereby the length of the tenons is controlled.

Still another feature resides in my novel adjusting bar which has a lug extending therefrom whereby the particular spacing of the particular chosen style of tenons, from the edge of the board, may be known and recorded so that a record may be kept of the particular manipulation.

Still further objects or advantages subsidiary or incidental to the aforesaid objects, or resulting from the construction or operation of the invention as it may be carried into effect, will become apparent as the said invention is hereinafter further disclosed.

In the accompanying drawings:

Fig. 3 is a front elevation of Fig. 1.

Fig. 4 is a rear elevation of Fig. 1.

Fig. 5 is an elevation of the rear clamping plate.

Fig. 6 is a view taken along the plane of line 6—6 of Fig. 5.

Fig. 7 is a plan view of the cam and its follower.

Fig. 8 is an inverted plan view of the members operated upon, and

Fig. 9 is a perspective view of the finished article.

Similar numerals represent similar parts throughout the several views.

Figure 1:
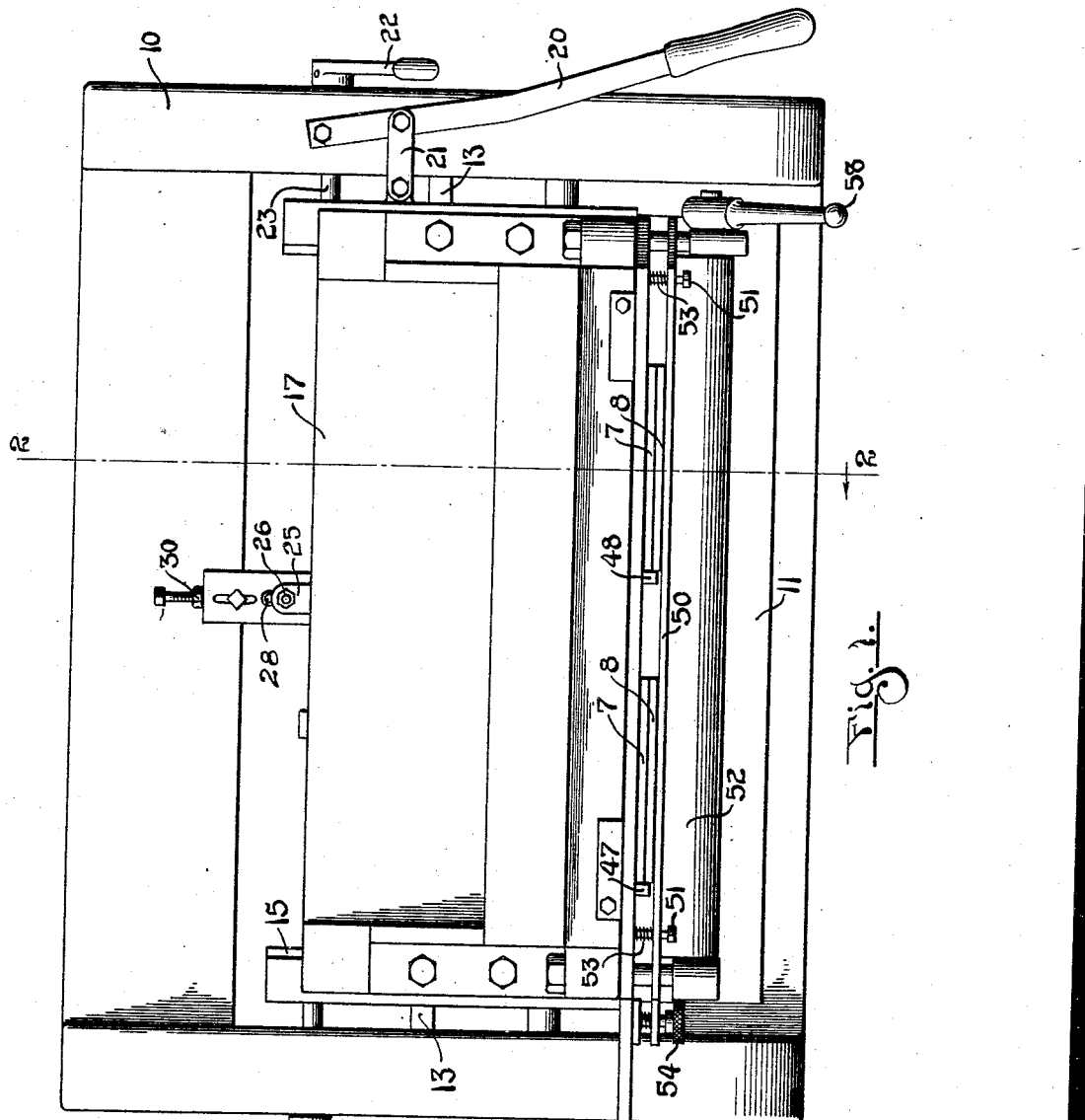
Fig. 1 is a plan view of a machine embodying my invention.

Referring particularly to Figs. 1–4, 10 indicates the supporting or base member having a bracket member 11 adjustably fastened thereto which terminates in a horizontal plate member 12, this plate member serving as an adjustable support for the lower ends of the boards which are adapted to be acted upon to form tenons at their ends. Thus, as will later be set forth, the wooden members 7 and 8 are pushed or dropped between clamping plates down upon the supporting member 12, and then the clamping members are tightened, thus locking the bottom edges of the members 7 and 8 in exactly the correct plane for the cutting of tenons at that particular edge.

A rib or cross member 13 is adapted to slidably receive a universal or apron member 14 which in turn has slots or grooves 15 into which projections 16 of the table member 17 are slidably received. These grooves or slots are formed at right angles to the rib 13 thus permitting the table member 17 to move in any direction in a substantially horizontal plane.

A handle member 20 is pivotally mounted on the base member 10 and through the linkage 21, see Fig. 1, is adapted to move the universal member crosswise of the machine. The table, being mounted upon this universal or connecting member, also moves crosswise of the machine. Another handle 22 actuates a shaft 23, this shaft being mounted in the base frame 10, and through the linkage 24 connected to the table 17 causes movement of the table lengthwise of the machine. See Fig. 2.

Figure 2:
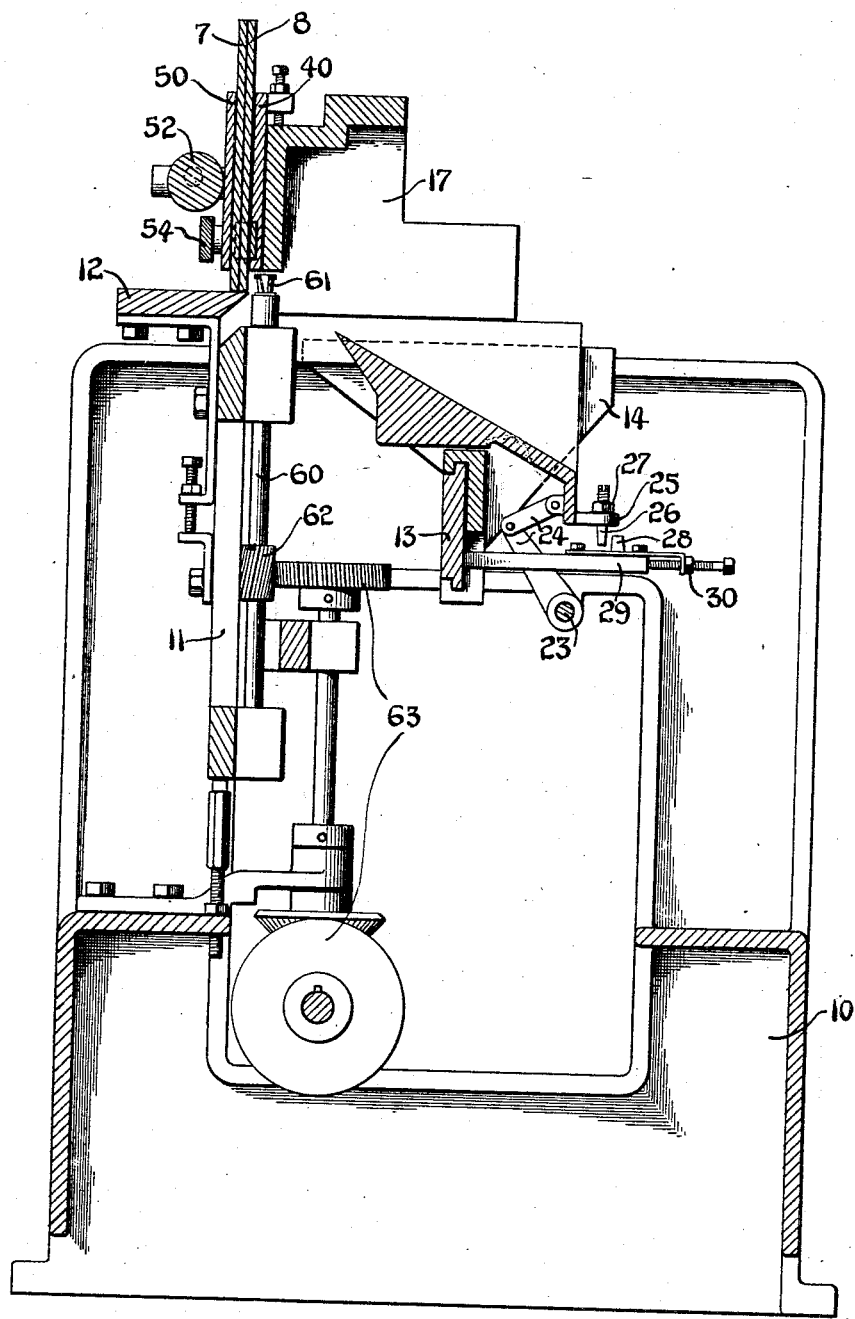
Fig. 2 is a view in cross section taken along the line 2—2 of Fig. 1.

The table has a lug 25 extending from its rear edge and a tapered cam follower or pin 26 is threaded through and locked in position by means of a nut 27. Thus, by rotating the pin 26, its height is changed or adjusted and the nut 27 serves to lock the pin in its chosen position. A projection or cam 28, see Figs. 2, 4 and 7, is rigid with the plate 29, this plate being slidably mounted on the base by means of the threaded construction as shown at 30.

From the above description it will be seen that the table member 17 may be moved in any chosen path, as, for instance, a circular or elliptical one, due to its particular style of mounting. The table itself may be moved directly by means of the handle member 22 in one direction and the table may be moved at right angles to the previous referred to direction by means of the handle member 20 acting indirectly upon the table through the linkage 21 which moves the universal member 14. The universal member 14 and the two members immediately adjacent thereto form a type of "Oldham coupling" and operate in the same fashion in exactly the same manner. The cam and follower arrangement serves to limit the minimum path through which the table can be manually actuated by means of proper manipulation of the handles or levers 20 and 22.

At the top of and near one edge of the table a plate 40 is adjustably but rigidly connected, this plate having a groove 42 adapted to receive the rod or slide 43. The plate 40 is also extended as at 41 and has a series of holes 44, see Fig. 4, these holes being adapted to receive a small pin 45 which also passes through one of the holes in one of the inclined rows of holes 46 formed in the rod 43. See Figs. 5 and 6. This rod has lugs or abutments 47 and 48 thereon as clearly shown in Fig. 6. These abutments or lugs may be spaced apart a distance equal to the distance between the several vertical shafts 60, which drive the cutters 61, multiplied by an integer. In other words, the distance between these abutments is a multiple of the distance between any adjacent vertical shafts 60.

The shafts 60 are connected to each other by means of herringbone gears 62 and these gears are actuated by means of any suitable driving arrangement as indicated at 63 as will be readily understood by those skilled in this art.

A clamping plate 50 is slidably mounted upon studs 51, see Fig. 1, in juxtaposed relation to the clamping plate 40 and an eccentric roller 52, actuated by the lever 58, is adapted to advance this plate inwardly to clamp the members 7 and 8 firmly between the plates or jaws. Spring members 53 release or separate the plates when the cam roller is turned so as to release the pressure on the outer plate. A threaded stud member 54 engages the plate 55, rigid with the large plate 40, and serves as additional means to hold the rod 43 against endwise movement. A handle 56 on the rod 43 aids in its adjustment along the groove 42 and by insertion of the pin through the aligned holes movement of the rod is prevented. Furthermore, such an adjustment provides means whereby a record may be kept as to the particular hole used and hence duplication of the particular setting may be obtained at any time in the future. Moreover, each setting will give a product suitable for a particular job and hence uniformity in this respect is obtained.

As shown in Fig. 8 the two pieces or members 7 and 8 are placed adjacent to each other and are carried around the cutters 61 thus forming tenons and mortises. The path of each set of members 7 and 8 is controlled by the pin 26 riding against the cam 28. The pin is kept in snug engagement with its guiding cam by proper manipulation of the actuating levers 20 and 22. It is also to be noted that the members 7 and 8 reinforce each other especially at the points designated at 6, Figs. 8 and 9, and thus prevent any tearing away of the wood from occurring at these points.

The operation of my improved machine is readily understood. The first step in its operation is the setting of the slide 43 to the position desired. Next, the four pieces of wood or the like, which are to be operated upon, are dropped downwardly between the clamping plates 40 and 50, these members or pieces of wood resting upon plate member 12, this plate member having been previously adjusted to the proper height. The height to which this member 12 is adjusted determines the depth of the mortise which is cut between the tenons. Next, the lever 58 is operated to clamp the several pieces 7 and 8 tightly in position and then, with the cutters 61 revolving at full speed, the handles or levers 20 and 22 are manipulated to cause the pin or follower 26 to travel in a curved path as indicated at 4 in Fig. 7, and also to cause the entire table to travel in exactly the same path. Thus, the pieces of wood are forced through and around the several cutters forming the desired shape at the ends of the pieces acted upon.

Having thus described my invention I desire it to be understood that the invention is in no wise limited to the particular illustrative embodiment disclosed, the scope thereof being set forth in the following claims.

I claim:

1. In a woodworking machine, a base, a table, means to mount the table on the base for movement in any direction in substantially a horizontal plane, cutting means rigidly mounted adjacent said table, clamping means on said table adapted to receive the members to be acted upon and hold them in the plane of the cutting means, manual means for moving the table, a cam follower depending from the table, and a rigid cam cooperably associated therewith, said cam and follower preventing movement of the table in a path smaller than the periphery of the follower.

2. A machine comprising the elements in combination as of claim 1 in which the cam and follower may be adjusted relative to each other.

3. A device of the character described comprising a base, a connecting member, a table, means for slidably mounting the table upon the connecting member whereby reciprocating movement is obtained, means for slidably mounting the connecting member upon the base whereby reciprocating movement is had, such movement being substantially at right angles to the path of the path of the aforesaid movement, a revolving cutter mounted on the base, clamping means on said table adapted to receive and maintain pieces of wood or the like below the plane of movement of the table, and means to move the table in a closed curved path whereby the cutter operates entirely around the depending pieces of wood.

4. A device of the character set forth in claim 3 but further characterized by the fact that the last mentioned means includes a rigid member having a curved perimeter, a pin attached to the table, said pin being adapted to contact with the aforesaid perimeter.

5. A device of the character set forth in claim 3 but further characterized by the fact that the last mentioned means includes a rigid member having a curved perimeter, a tapered pin, and means to adjustably attach the pin to the table whereby it contacts with the perimeter of the rigid member and is adapted to be vartically adjusted to vary the path of movement of the table.

6. In a horizontal table supported by an "Oldham coupling" and having revolving cutters adjacent thereto, the combination of a plate rigid with the table, said plate having a groove in its outer face, a juxtaposed plate, means to move the plates toward and away from each other whereby wooden plates may be clamped therebetween, an adjusting rod slidably mounted in said groove, said rod having a series of holes therein, means passing through said holes and engaging the plate therebehind to lock the rod in chosen position.

7. A woodworking machine adapted to cut tenons comprising a stationary revolving cutter, clamping means adapted to hold plates which are adapted to be operated upon in the plane of the cutter, and means to move the clamping means and means to guide the plates in an orbit about the cutter.

8. The method of simultaneously cutting a plurality of tenons in the end of members which consists of placing the members in abutting relationship, supporting the members a distance from their ends which are to be operated upon, then revolving the supporting means entirely around the several cutters.

9. A horizontal table supported by an "Oldham coupling", a series of cutters mounted adjacent the table, means for moving the table in a chosen path, clamping plates on the table adapted to receive two sets of members to be operated upon and hold them in the plane of the cutter and means adapted to abut the sets of members between the clamping plates to prevent their movement lengthwise of the jaws, said abutting means being spaced apart a distance equal to the distance between individual cutters multiplied by some whole number.

10. In combination, a base, a universal member, a table, means for slidably mounting the table upon the universal member, means for slidably mounting the universal member upon the base, means to move the universal member relative to the base, lever means mounted on the base and means between said lever means and the table whereby the table may be moved.

11. In a machine of the type set forth, a support, a table, means for mounting the table upon the support whereby it may move in any direction in a chosen plane, a cam on the table and a pin on the support riding against said cam whereby the movement of the table is controlled.

In testimony whereof I affix my signature.

CHARLES B. DART.